March 4, 1941.　　　F. D. JONAS　　　2,233,480
FILING CABINET SHELL
Filed Sept. 14, 1938　　　7 Sheets-Sheet 1
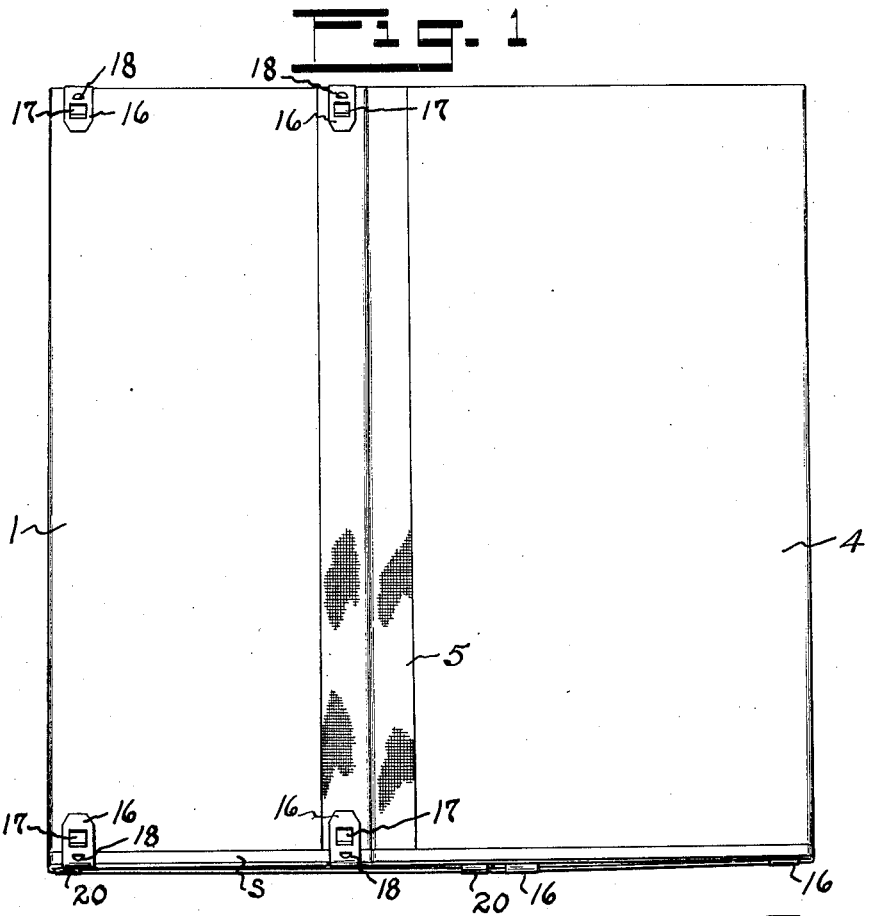
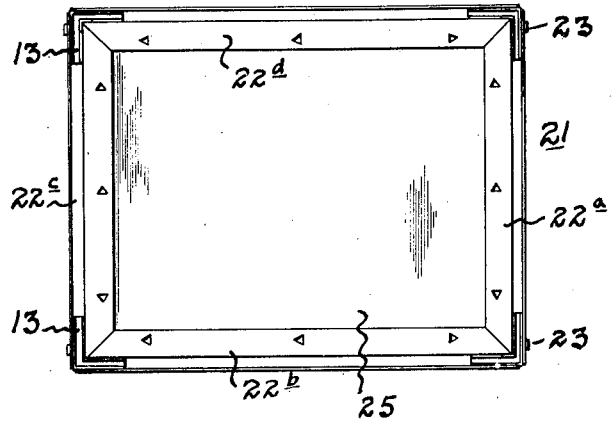
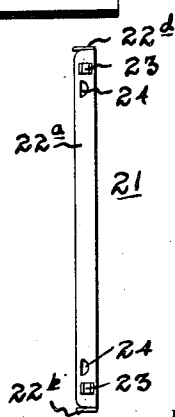
INVENTOR.
Frank D. Jonas
BY
Darby & Darby
ATTORNEYS March 4, 1941.　　F. D. JONAS　　2,233,480
FILING CABINET SHELL
Filed Sept. 14, 1938　　7 Sheets-Sheet 2
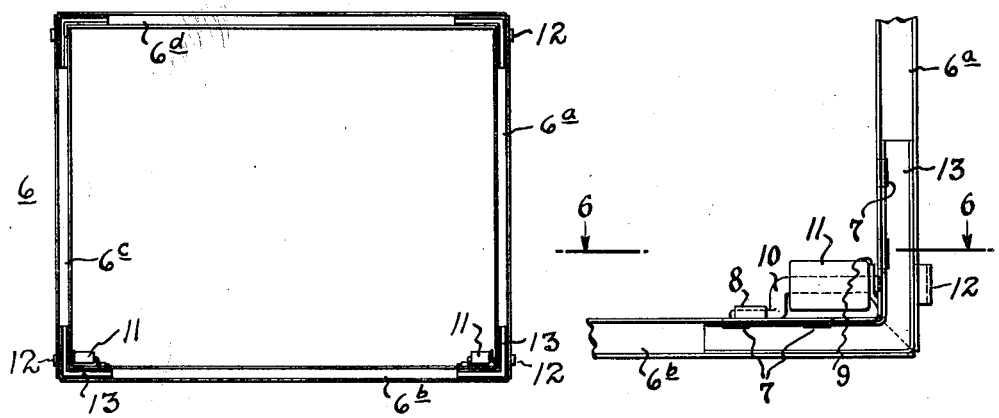
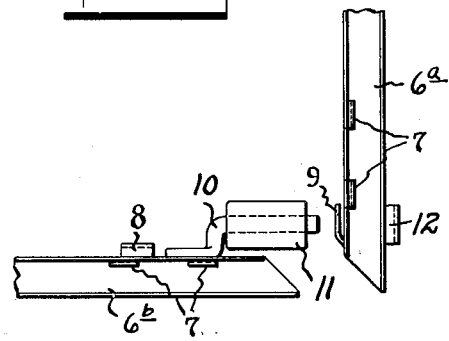
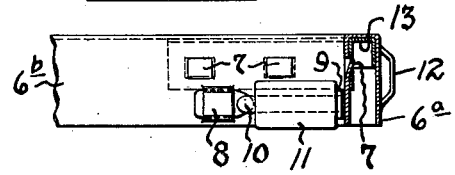
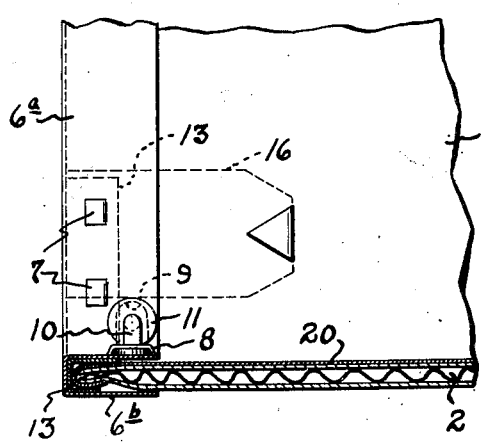
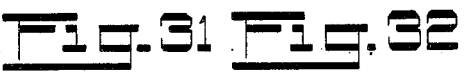
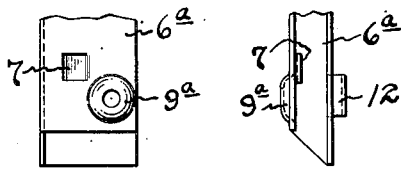
INVENTOR.
Frank D. Jonas
BY
ATTORNEYS March 4, 1941.　　F. D. JONAS　　2,233,480
FILING CABINET SHELL
Filed Sept. 14, 1938　　7 Sheets-Sheet 3
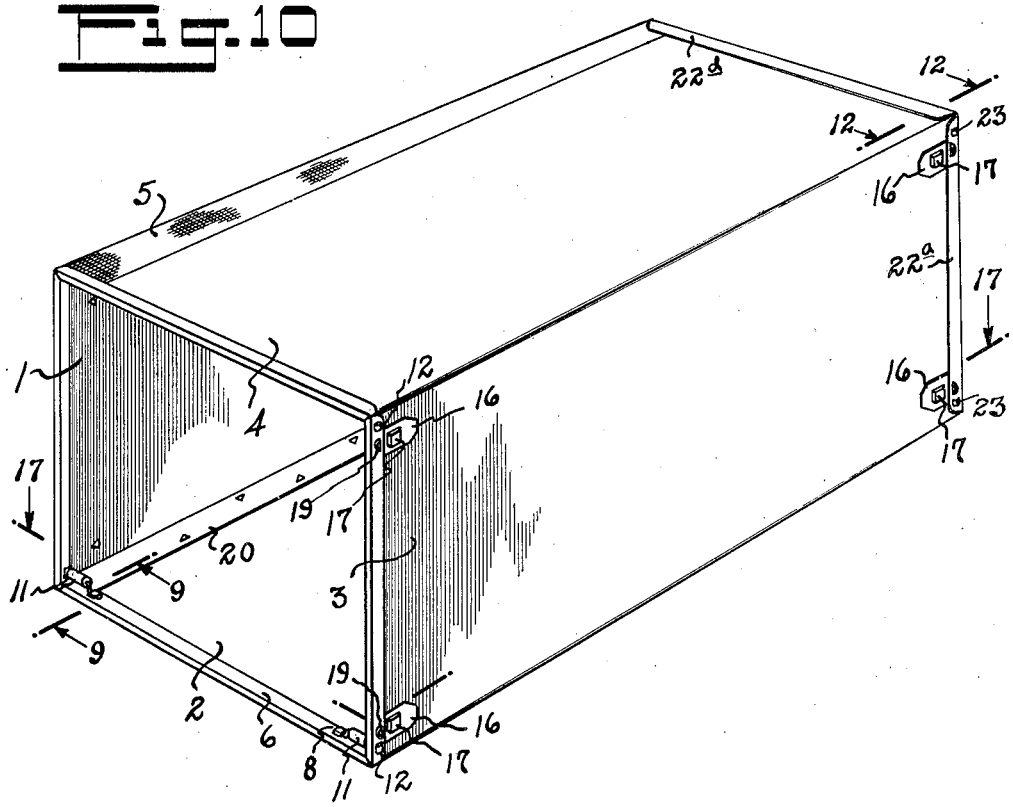
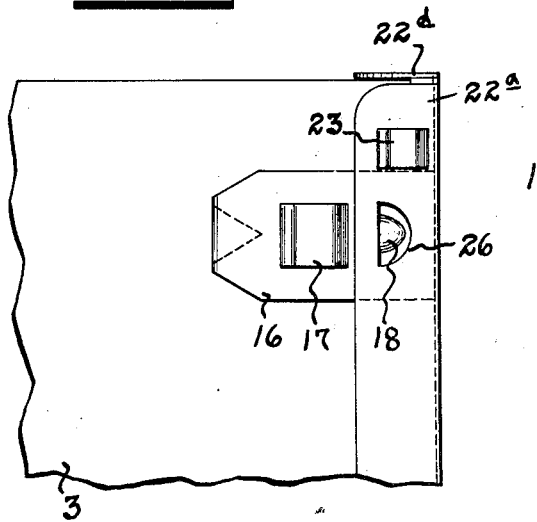
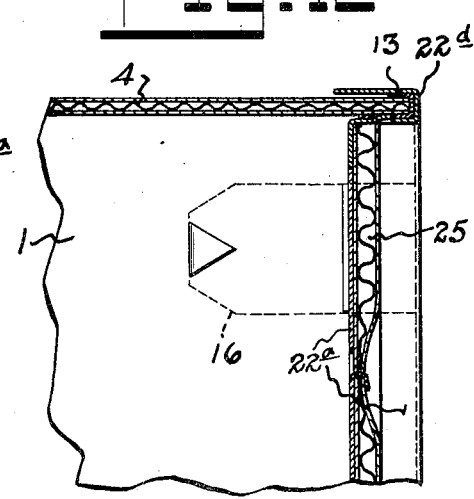
INVENTOR.
Frank D. Jonas
BY
ATTORNEYS March 4, 1941.  F. D. JONAS  2,233,480
FILING CABINET SHELL
Filed Sept. 14, 1938  7 Sheets-Sheet 4

INVENTOR.
Frank D. Jonas
BY
ATTORNEYS

March 4, 1941.　　　F. D. JONAS　　　2,233,480
FILING CABINET SHELL
Filed Sept 14, 1938　　　7 Sheets-Sheet 5

INVENTOR.
Frank D. Jonas
BY
ATTORNEYS

March 4, 1941.                F. D. JONAS                2,233,480
                          FILING CABINET SHELL
              Filed Sept. 14, 1938          7 Sheets-Sheet 6
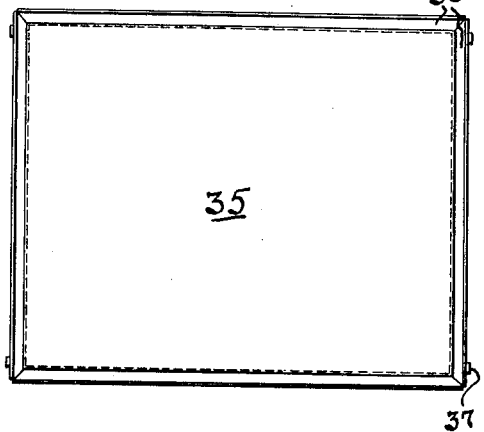
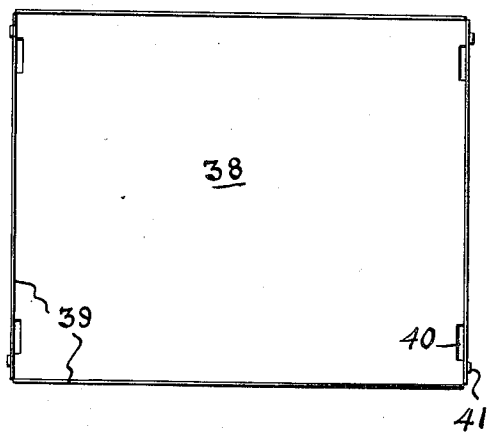
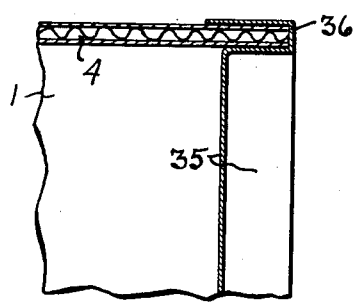
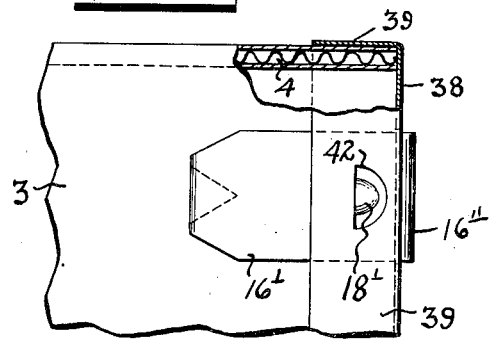
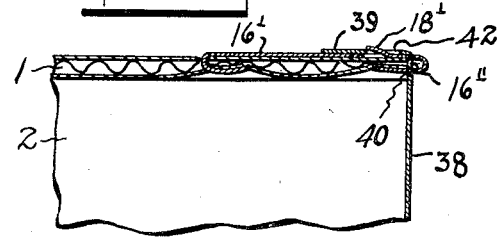
INVENTOR.
Frank D. Jonas
BY
Danby & Danby
ATTORNEYS March 4, 1941.   F. D. JONAS   2,233,480
FILING CABINET SHELL
Filed Sept. 14, 1938   7 Sheets-Sheet 7
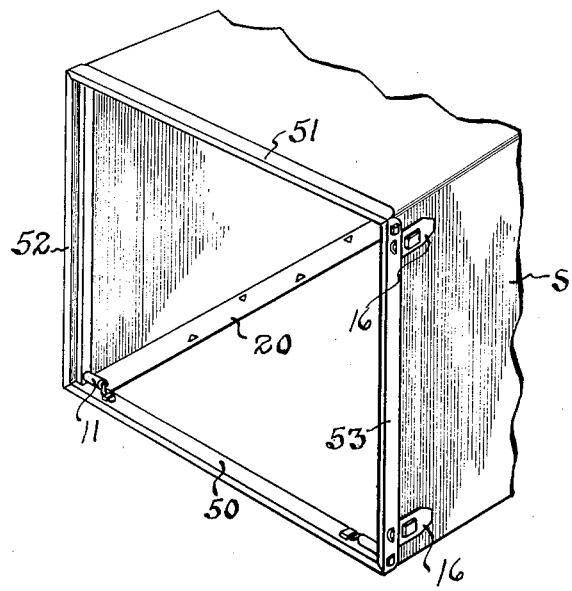
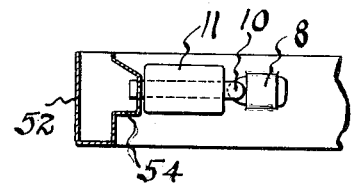
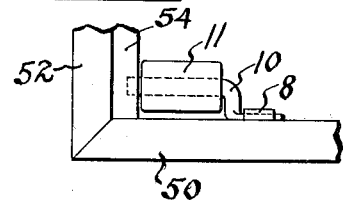
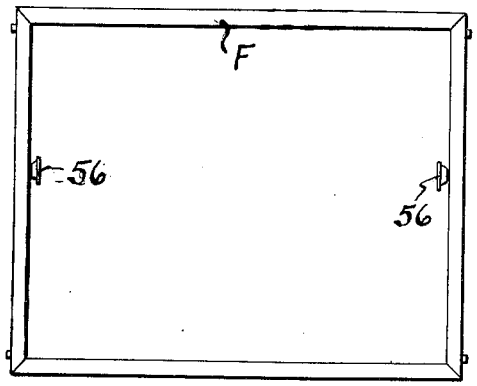
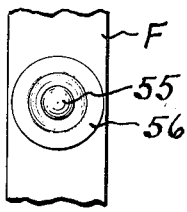
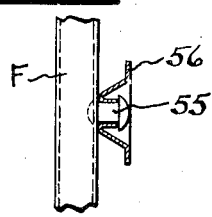
INVENTOR.
Frank D. Jonas
BY
Darby & Darby
ATTORNEYS Patented Mar. 4, 1941

2,233,480

UNITED STATES PATENT OFFICE 2,233,480

FILING CABINET SHELL

Frank D. Jonas, East Williston, N. Y., assignor to Oxford Filing Supply Co., Brooklyn, N. Y., a partnership comprising Richard A. Jonas, Richard A. Jonas, Jr., Robert P. Jonas, Frank D. Jonas, and Edward F. Jonas Application September 14, 1938, Serial No. 229,810

4 Claims. (Cl. 312—141)

This invention relates to improvements in shells for filing cabinets made of cardboard, corrugated board, fibre board and the like.

The general object of the invention is to provide an improved form of shell of as simple construction as possible yet fully capable of withstanding all the loads and strains incident to the use thereof.

An object of the invention is to provide a shell of this type made of a relatively flexible, non-rigid material reinforced in a manner to adapt the shell to contain heavily loaded drawers.

Another object of the invention is to provide a tubular shell of this type closed at one end by means of a closure member which may be snapped on and removed as a unit, and reinforced at the other end which normally remains open by means of a metal reinforcing collar which may be snapped on and removed as a unit, whereby the shells when loaded and stacked are capable of withstanding far greater compressive loads than the material of which the tubular shell itself is capable of withstanding.

Another object of the invention is to provide in combination with these reinforcing and closure members interlocking devices by means of which vertically stacked shells may be aligned and interlocked and adjacent columns of shells may be interconnected to form a bank of shells.

A further object of the invention is to provide roller or anti-friction devices on the reinforcing collar to facilitate the sliding movement of drawers in the shell and to provide in the shell tracks to be engaged by rollers mounted on the drawer for the same purpose.

These and many other objects as will appear from the following disclosure are secured by means of this invention.

This invention resides substantially in the combination, construction, arrangement and relative location of parts, all in accordance with the following description taken in connection with the attached drawings.

In the accompanying drawings,

Figure 1 is a substantially plan view of the tubular shell in accordance with this invention folded flat in condition for shipping;

Fig. 2 is an inside elevational view of the closure member for the rear end of the tubular shell;

Fig. 3 is a side elevational view thereof;

Fig. 4 is an inside elevational view of the reinforcing collar for the other end of the tubular shell;

Fig. 5 is an enlarged view at the corner of the collar from the same side;

Fig. 6 is a cross-sectional view taken on the line 6—6 of Fig. 5;

Fig. 7 is a view similar to Fig. 5 with the parts exploded;

Fig. 8 is a view similar to Fig. 7 showing a modified construction for mounting the rollers;

Fig. 9 is a cross-sectional view taken on the line 9—9 of Fig. 10;

Fig. 10 is a perspective view of the shell with the rear end closure member in place and the reinforcing collar mounted at the open end;

Fig. 11 is an enlarged outside elevational view showing the manner of attaching the rear closure member in place;

Fig. 12 is a cross-sectional view taken on the line 12—12 of Fig. 10;

Fig. 26 is an elevational inside view of another form of rear closure member;

Fig. 27 is a cross-sectional view through the top wall of the shell showing the closure member of Fig. 26 in place;

Fig. 28 is a view similar to Fig. 26 of another form of rear closure member;

Fig. 29 is an outside elevational view of a corner of the shell with the closure member of Fig. 28 in place;

Fig. 30 is a cross-sectional view through a side wall showing the manner of attaching this form of closure member;

Fig. 31 is an inside edge elevational view of a modified form of vertical frame member showing a different way for supporting the roller axle;

Fig. 32 is a similar view taken from the right side of the view of Fig. 31;

Fig. 33 is a perspective view of the front end of a shell or casing showing a modified form of reinforcing frame having the vertical members of the frame formed to provide a rabbet;

Fig. 34 is a cross-sectional view through one of these modified side members looking downwardly showing the manner in which the roller axle is supported;

Fig. 35 is a front elevational view of what is shown in Fig. 34;

Fig. 36 is a front elevational view of a still further modified form of reinforcing frame;

Fig. 37 is a side view of a portion of one of the vertical members of the frame showing a modified form of roller; and Fig. 38 is a view of the structure of Fig. 37 at right angles thereto showing the roller in cross-section.

In the field of office equipment there is now well known the form of filing cabinet mostly used for dead or storage files made of a flexible fibrous material such as cardboard, corrugated board, fibre board, and the like. The filing cabinet comprises a shell and a drawer. The invention herein disclosed is concerned with such a shell.

Shells of this type comprise top, side and bottom walls and a rear end wall of suitable construction which when in use is positioned so that the open end of the shell faces forwardly and receives in sliding arrangement a drawer of similar material. These filing cabinets are frequently made in so-called large sizes so that when the drawers are full of papers and like materials, they are quite heavy. It is common practice to stack these filing cabinets in vertical columns so that the lower cabinets in the columns are subjected to considerable compressive loads. When made of fibrous material of the type mentioned above they are incapable in themselves of sustaining such loads unless properly reinforced.

One of the objects of this invention is to provide a construction in which metal is used for reinforcing the shells at both the rear closed end and the front open end by means of metal members which makes them adequately strong to support such loads. These reinforcing members also act to hold the walls of the shell in right angle relation to each other under such loads. It is also within the scope of this invention to dispense with the metal reinforcing member for the rear end of the shell and use flaps integral with the walls of the shell which can be folded over in various known ways to form the usual box end.

It is a very important practical consideration in connection with structures of this type to provide constructions which are at the same time entirely capable of performing the functions for which they are provided and yet are so simple and inexpensive as to make them economically feasible and place them in a competitive position with all-steel filing cabinets. Many efforts in the past to attain the general objects of the invention herein disclosed have been successful in providing strong practical shells, but which are so expensive and complicated as to keep them off the market or greatly limit their sales.

Figure 13:
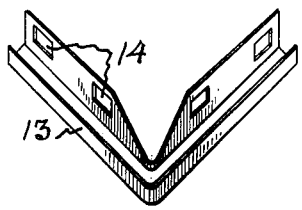
Fig. 13 is a perspective view of one of the reinforcing members for the corners of the closure member and the collar.
Figure 14:
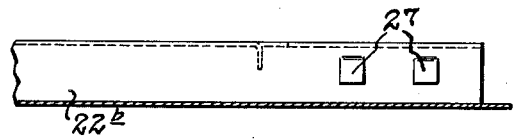
Fig. 14 is a longitudinal, sectional view through one of the frame members of the closure member.
Figure 15:
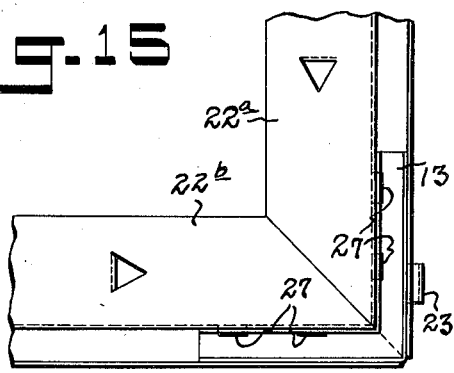
Fig. 15 is an enlarged inside view of one of the corners of the closure member.
Figure 16:
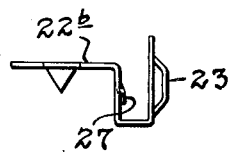
Fig. 16 is an end elevational view of one of the frame members of the closure member.

In the form of shell disclosed in this case the fibrous portion of the shell itself is formed from a rectangular blank which is scored to divide it into the four panels 1, 2, 3 and 4, any one of which may be the bottom wall. The blank is folded on the score lines into tubular form and the terminal edges which are now in abutting position are hingedly connected together in any suitable manner as by means of a gummed strip of reinforcing tape 5. The result is that the tubular shell formed may be collapsed into a substantially flat position as shown in Figure 1, and opened up by relative hinging movement at the score lines between adjacent walls into rectangular form as shown in Fig. 10. The reinforcing collar for the front end of the shell is shown in Fig. 4 at 6 as a relatively flat frame of true rectangular form. This frame is built up of side members 6ª, 6ᵇ, 6ᶜ and 6ᵈ, which preferably meet on a mitre joint as shown. These frame members are of simple rectangular channel form in cross-section, as is clear for example from Fig. 6, and are united at the corner by means of a right angle reinforcing corner piece 13 which is likewise of simple rectangular form in cross-section, as is clear from Fig. 13. One leg of the channel of this corner is longer than the other and has the apertures 14 therein. These apertures are positioned to receive the struck-up ears 7 on the frame pieces, as is clear from Figs. 5 and 6. Thus the rectangular frame or collar is built up of four simple pieces which are rigidly united together into a rectangular frame by simply snapping the four corner pieces 13 in place. The collar or frame is preferably shipped in assembled form, but can be shipped in pieces if desired. Since it is flat it packs easily with the collapsed tubular shell, and hence is easily packed for shipment.

If desired the bottom frame member 6ᵇ may be provided with a pair of rollers 11 on which the drawer may be moved in and out of the shell with a minimum of frictional resistance and damage thereto. The rollers 11 are mounted on short axles 10, the construction of which is clear from Figs. 5, 6 and 7. The axles consist of short lengths of round rod as shown having an opposite end which is flat so as to fit snugly in a struck-up loop 8 in one leg of the frame piece 6ᵇ. The other end fits into a round hole in the struck-out ear 9 on the adjacent side frame piece 6ª. The manner of assembling the parts is clearly shown in Fig. 7. The flattened end of the axle is slipped into the loop 8, the roller 11 is mounted on the axle and the side frame piece 6ª is moved into position so that the end of the axle 10 fits in the hole in the ear 9. The corner piece 13 is then snapped in place and all parts are then firmly and securely locked together.

The preferred form of construction by means of which the roller axle is supported at the end is clearly illustrated in Figs. 31 and 32 wherein the vertical side members of the reinforcing frame of which the member 6ª in these figures is an example comprises a boss 9ª which is pressed up out of the metal without cutting the metal and apertured to receive the end of the axle. This construction is preferred to the previous one because, as is obvious, it is stronger, the boss being completely integral with the frame member. As with the cut-out ear structure the boss arrangement provides a space for the end of the axle to project into without it overlapping into the channel so as to interfere with the application of the frame to the shell.

As a variation of the roller support the axle 10' may have one end riveted into an ear 15 which is struck-up out of the lower frame piece 6'. The other end of the axle 10' fits in an aperture in the struck-out ear 9, as shown before.

Figure 17:
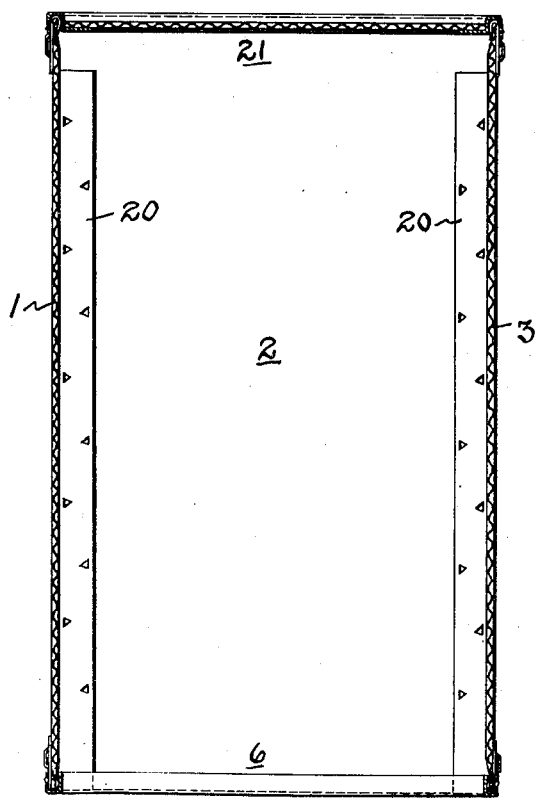
Fig. 17 is a cross-sectional view taken on the line 17—17 of Fig. 10.

Secured to what may be termed the side walls 1 and 3 of the shell as shown in Figs. 1 and 10 are the plates 16. These plates are attached by means of a triangular edge which pierces the material of the side wall and is bent over to secure one end thereof in place. The other end is folded over the edge of the side wall as shown in Figs. 1 and 17. There is a pair of these plates 16 for each side wall at each end and they are secured to the tubular shell near the corners, as is clear from Fig. 10. Each plate 16 is provided with a struck-out loop 17, the use of which will be described later, and a small dome shaped ear 18, the construction of which is clear from Figs. 11 and 30. The front frame 6 is provided with suitably shaped apertures 19 so that when the frame is mounted on the front open end of the tubular shell the ears 18 snap into the apertures 19 and securely lock the frame in place. The front edge of the tubular shell fits into the rectangular channel on the inner face of the frame 6. If desired the raw edge of the fibrous material of the tubular shell may be trimmed, reinforced and finished by means of a strip S, which may consist simply of a gummed tape, or if desired, four separate U-shaped metal strips clamped thereon but disconnected at the ends so that the shell may be collapsed. With this construction it will be immediately seen that the front reinforcing collar may be easily snapped onto the shell aperture it has been put into rectangular form, reinforcing the bent end thereof, finishing off the edge and holding the walls in the right angle relation. The side members of the frame form vertical columns to transmit downwardly the compressive loads due to stacking of the shells, thereby preventing buckling of the relative flexible materials of the walls.

Figure 18:
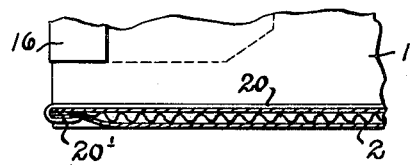
Fig. 18 is a cross-sectional detail view through the bottom wall of the shell with the reinforcing collar removed, showing the manner of attaching the track.
Figure 19:
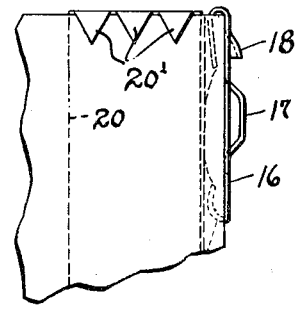
Fig. 19 is another detail view showing the manner of attaching the track.

In the cases where the rollers are to be used it is apparent that the drawer will likewise have a pair of rollers at the rear across the bottom wall thereof, and there is therefore desirably provided a pair of tracks 20 mounted on the shell on which these rollers operate. These tracks (see Figs. 9 and 10) are secured on the inner face of the bottom wall 2 of the shell by means of triangular struck-out ears which pierce through the material of the wall and are clinched over. The front end of the strip, as shown at 20' (see Fig. 18) is clinched over the edge of the bottom wall and is hidden within the reinforcing frame when the parts are assembled.

The closure member for the rear end of the tubular shell is shown in one form at 21 in Figs. 2, 3, 10, 11, 12 and 14 to 17 inclusive. In this form it is built up of four members which are channel shaped and of the form shown clearly in Figs. 11 to 16 inclusive. The four members 22ª, 22ᵇ, 22ᶜ and 22ᵈ meet at mitre corners and are interconnected and locked in rectangular relation by means of the reinforcing corner pieces 13 as before. These corner pieces are held in place by means of struck-up ears 27 which cooperate with the apertures 14 of the corner pieces. The side frame members 22ª and 22ᶜ are each provided near one end of the outer face by struck-out loops 23, the use of which will be described later. They are also provided with suitably shaped openings 24 for cooperation with the dome shaped ears 18 on the rear plates 16. Thus this closure member may be snapped in place over the rear edges of the tubular shell and locked thereon in a manner similar to that by means of which the front reinforcing frame is attached.

In the form of structure being described the frame is closed by means of a sheet 25 of any suitable material which may be a fibrous material which is held in place by struck-out triangular ears which pierce it and are clinched over in a well known manner. Thus the rear closure member acts to reinforce the shell to support compressive loads and to hold the walls in right angle relation. The closure member at the rear and the frame at the front form an exceedingly strong container which although made of relatively flexible material is able to withstand buckling, twisting, and distortion due to loading.

The construction is exceedingly simple and relatively inexpensive to manufacture and assemble. The rear closure member locking the other parts is flat and hence is adapted to simple compact packing for shipment. It may be noted that in some cases the reinforcing corner pieces 13 may be dispensed with and the frame members united in some other way as by welding, or by other forms of structures used for bracing the corners of metal frames.

Figure 20:
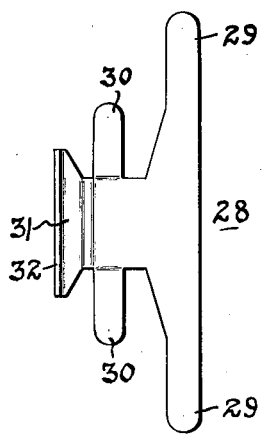
Fig. 20 is a side elevational view of one of the aligning and interlocking keys.
Figure 21:
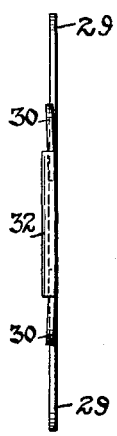
Fig. 21 is a front edge elevational view thereof.
Figure 22:
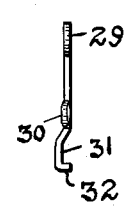
Fig. 22 is a top edge view thereof.
Figure 24:
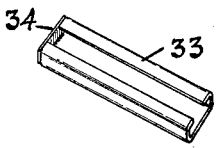
Fig. 24 is a perspective view of one of the locking devices for interconnecting an adjacent pair of keys.

The key for interlocking and aligning the shells in vertical columns and interconnecting adjacent columns is shown in Figs. 20 et seq. It consists of a substantially flat plate of suitable material such as metal, having a pair of ears 29, a pair of relatively shorter ears 30, a central extension 31 in the plane thereof, and a right angle or flange terminal edge 32 of relatively limited width.

Figure 23:
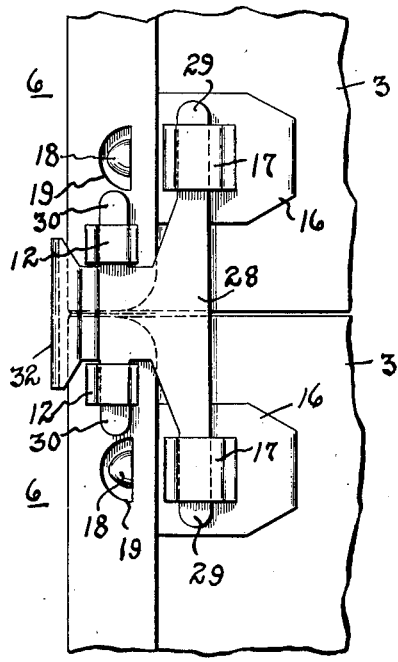
Fig. 23 shows a pair of vertically stacked shells aligned and interlocked with a key.
Figure 25:
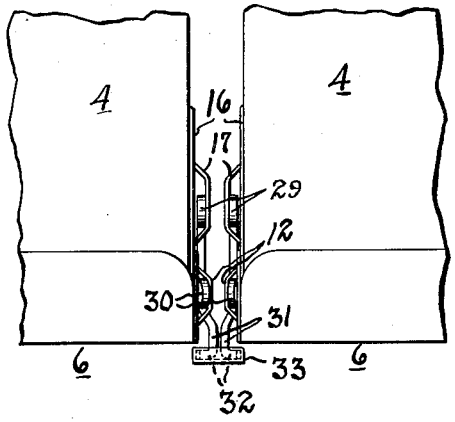
Fig. 25 is a plan view of the adjacent edges of a pair of stacks interlocked by means of keys.

Fig. 23 shows a pair of shells vertically stacked. When thus arranged the loops 12 on the side members of the frames 6 are vertically aligned while the loops 17 on the plates 16 are vertically aligned. As the shells are placed in this position a key 28 may be positioned so that the ears 29 lie in the loops 17 and the ears 30 lie in the loops 12. This vertically aligns the shells and interlocks them so that they may not have relative movement. It will be noted that not only are the frames 6 of the shells interlocked, but likewise the walls thereof are interlocked. By constructing the case as shown so as to interconnect both with the frame members and with the plates 16 on the shell they have the added and highly important function of securely holding the frames and shell walls in proper position so that even under loading they will not tend to move apart because of buckling and become disconnected. In other words, these keys act to prevent buckling of the side walls and consequent unlocking of the frame from the plates. The flanged extension 31 projects a little beyond the plane of the openings of the stacked shells as shown. When adjacent columns of stacked shells are used as shown in Fig. 25 they may be interconnected at each of the adjacent pairs of keys 28, by means of a clip 33 which is shown as substantially a tubular piece having a slit in the side wall wide enough to receive a pair of keys. One end of the clip 33 is closed by means of a wall 34 or integrally bent over ears so that the key when slid down onto a pair of oppositely extending but adjacent flanges 32 locks them together. Thus the adjacent stacks or columns are held in true vertical and parallel alignment.

It is apparent from Fig. 10 that the rear ends of the shells are interlocked and aligned by smaller keys which engage in the loops 17 on the plates 16 and the loops 23 on the side members of the rear closure unit. Likewise adjacent columns may be interconnected with the clips 33 in the same manner. In the construction illustrated it will be noted, as is clear from Fig. 25 that the clips 33 engage the ears 32 in a plane which is offset from and parallel to the plane of the fronts of the stacked shells. By this arrangement they are easily accessible and permit of interlocking of adjacent columns even though they are out of level and horizontal alignment which is often the case in the actual use of these filing cabinets.

Several modified forms of rear closure units are shown in Figs. 26 to 30 inclusive. In the form shown in Figs. 26 and 27 it consists of a single continuous piece of suitable material such as metal formed into a central panel 35 and a circumferential edge comprising substantially rectangular channels 36. This member is slipped over the edges at the rear of the shell in an apparent manner and is provided with apertures similar to the apertures 24 of the structure of Fig. 3 for interlocking engagement with the ears 18 on the rear plates 16. The side edges of this unit are provided with loops 37 corresponding to the loops 23 of the other arrangement to receive the keys 28.

The structure of the remaining figures is still simpler in that it consists of a single piece of suitable material such as metal formed to provide a center panel 38 and a simple right angle flanged edge 39 which fits over the shell. The flanges 39 are provided with apertures 42 to receive the ears 18' of the plates 16' as described before. In this arrangement the plates 16' are mounted offset from the plane of the rear edges of the shell, as shown at 16', so as to project through similarly shaped apertures 40 in the center panel 38.

A modified form of front end reinforcing frame is illustrated in Figs. 33, 34 and 35. The shell has been generally indicated by the reference numeral S and is provided with plates 16 as before clipped thereon as clearly shown in the drawings. In this case however the side or vertical members 52 and 53 of the rim are formed as is clearly shown in Figs. 34 and 35 so as to provide a shoulder 54 extending in a vertical direction. In other words the rim is formed to provide a rabbet at the side members against which the front wall of the drawer may rest providing a stop for the drawer and further strengthening the columns formed by the stop members against compressive loads. In this case the side members do not need to have the ears 9 or the bosses 9a formed thereon because their shape is such as is clear from these two figures so as to provide adequate space for the ends of the axles 10 without their projecting into the channel which receives the edges of the shell. Thus this form of side member need only be suitably apertured to receive the ends of the axles 10.

A still further modified arrangement is shown in Figs. 36 to 38 inclusive in that a different type of roller construction is employed. In this case the rollers 56 which are in the form of small cups are rotatably mounted on pivot pins 55 secured in the side vertical members of the metal frame F. It will be noted that these rollers 56 are mounted in the region of the longitudinal center of the side members of the frame for cooperation with track members mounted on the sides of the drawer (not shown) so that the drawer is in fact sustained therefrom and preferably sufficiently so as to clear the bottom of the shell reducing frictional resistance to movement of the drawer. With this arrangement the drawers do not need to be provided with rollers, and hence the tracks 20 can be eliminated.

From the above description it will be apparent to those skilled in the art that there is provided herein certain features of construction which may be embodied in other physical forms without departure from the novel scope thereof. I do not, therefore, desire to be strictly limited to the disclosure as given for purposes of illustration, but rather to the claims granted me.

What I seek to secure by United States Letters Patent is:

1. A device of the type described comprising a tube of fibrous material comprising four walls hingedly united together, a pair of metal plates secured to an opposite pair of walls at at least one end of the tube, said plates having struck-out ears thereon, a rectangular metal frame lying over the end edges of the tube and having apertures to receive said ears whereby the frame is detachably secured to the tube to hold it when attached in rectangular form and key members interlocking each plate with said frame to hold said walls against buckling.

2. An open reinforcing collar of the type described comprising four side members each of channel formation, said members each having struck-out ears and right angle corner pieces interconnecting the adjacent ends of each pair of members and engaged by said ears to lock them in place and unite said members, anti-friction devices, and means for attaching said devices to said frame, said attaching means being secured to the frame by the action of said corner pieces uniting said members.

3. In a device as described, a tube of fibrous material comprising four walls hingedly united, metal plates secured to at least an opposite pair of said walls on one end of the tube, a rectangular metal frame fitted over the end edges at one end of the tube, means on said plates and frame cooperating to hold the frame on said tube, and double-pronged keys interconnecting said plates respectively with said frame to hold the walls from separating from the frame.

4. A reinforcing frame for a tubular shell as described, comprising four members of channel-shape in cross-section, said members abutting in pairs to form an open frame, right-angled corner pieces channel-shaped in cross-section lying in the channel members at the corners to unite the members to form a rigid frame, rollers, and bearing members for said rollers, and means at a pair of corners of the frame for locking said bearing members to the frame when said members are locked in assembled relation.

FRANK D. JONAS.